Dec. 13, 1932.  R. H. LAWSON ET AL  1,890,880
METHOD OF AND ATTACHMENT FOR RUNNING-ON KNITTING FABRICS
Filed Aug. 29, 1928   9 Sheets-Sheet 1
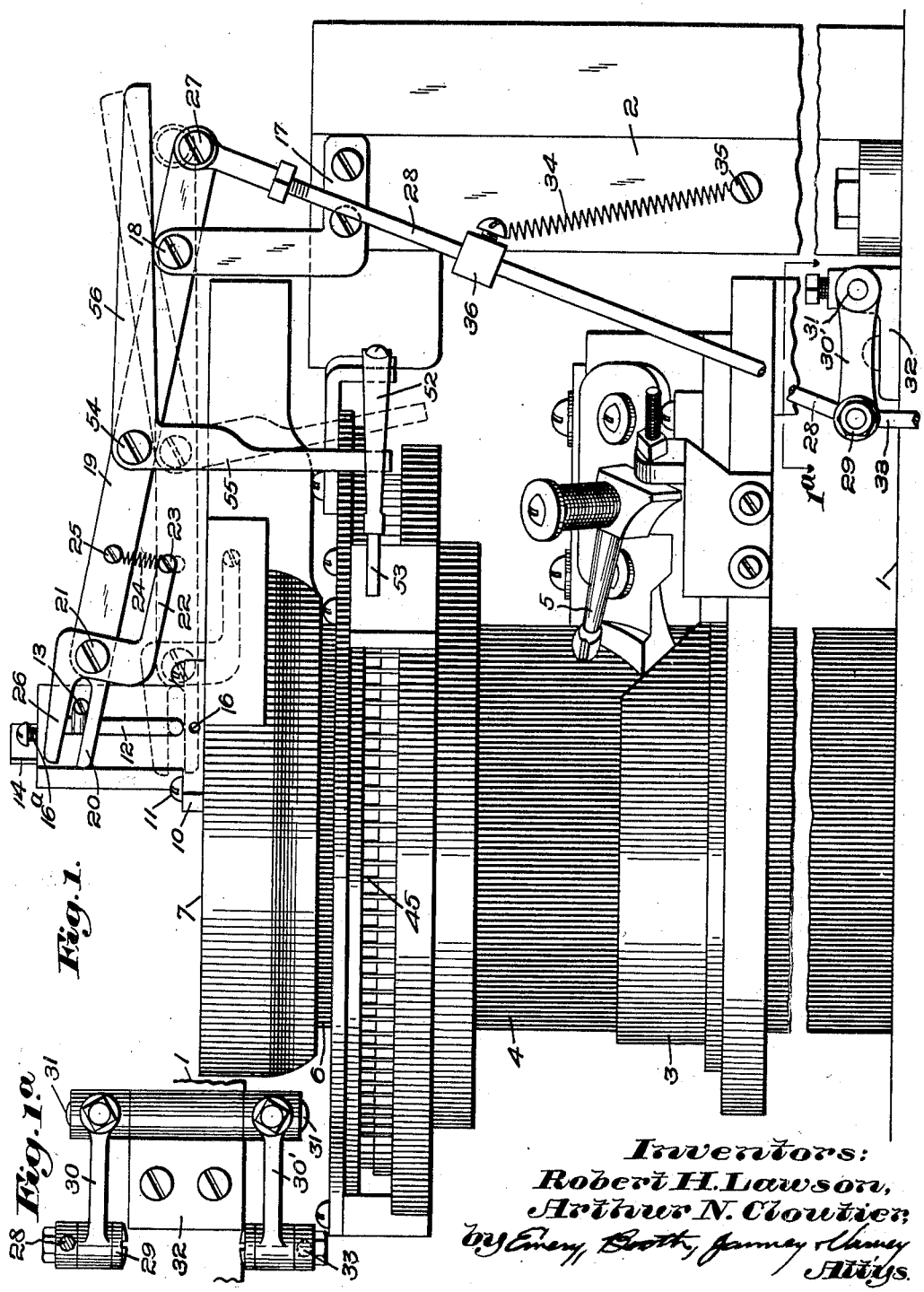
Inventors:
Robert H. Lawson,
Arthur N. Cloutier,
by Emery, Booth, Janney & Varney
Attys.

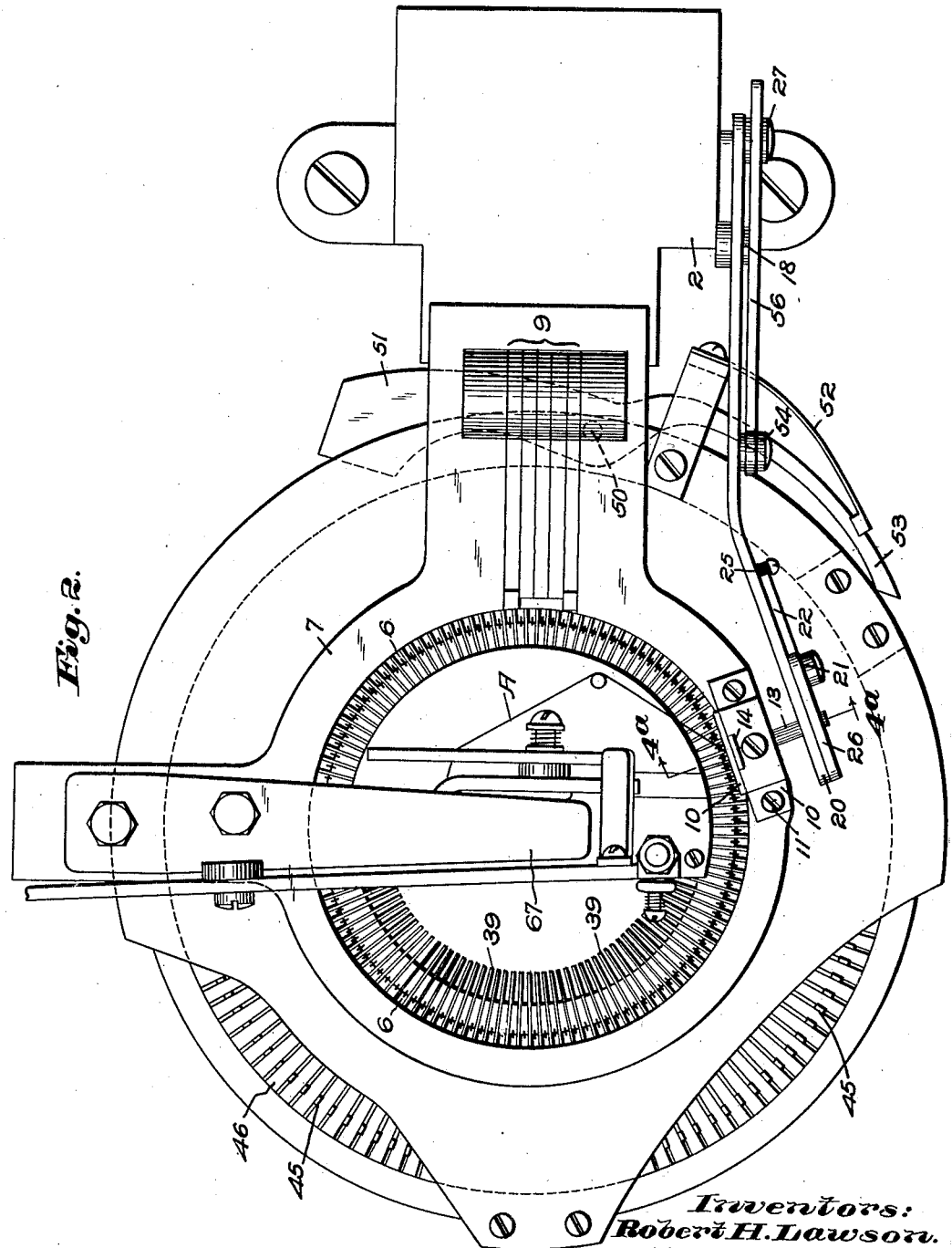

Dec. 13, 1932.      R. H. LAWSON ET AL      1,890,880
METHOD OF AND ATTACHMENT FOR RUNNING-ON KNITTING FABRICS
Filed Aug. 29, 1928      9 Sheets-Sheet 3
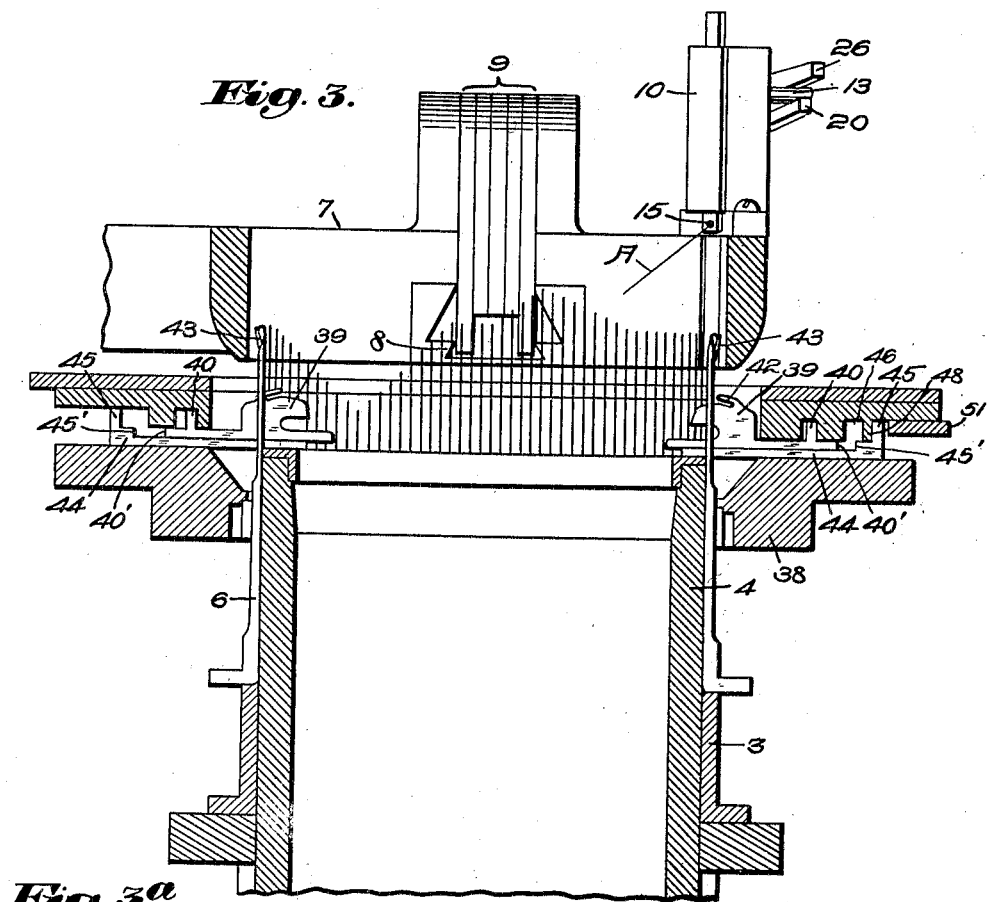
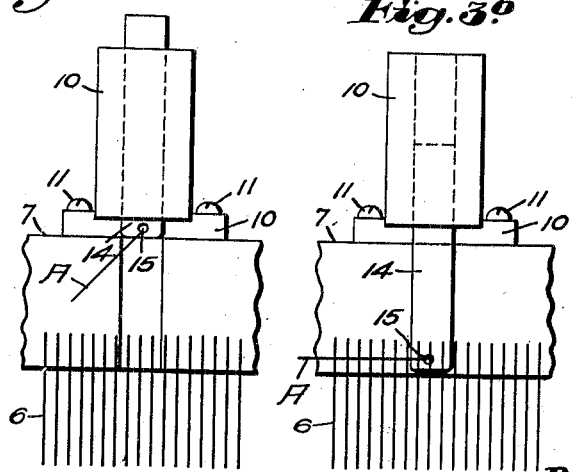

Dec. 13, 1932.   R. H. LAWSON ET AL   1,890,880
METHOD OF AND ATTACHMENT FOR RUNNING-ON KNITTING FABRICS
Filed Aug. 29, 1928   9 Sheets-Sheet 4
*Fig. 4.*
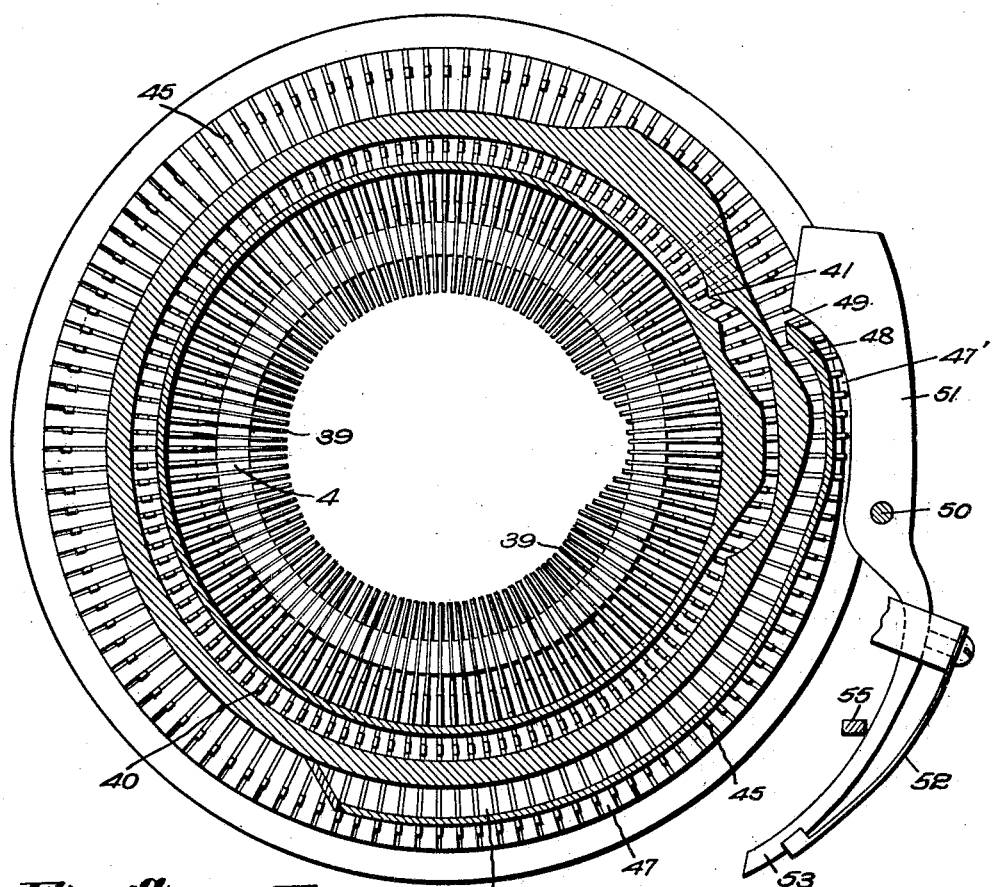
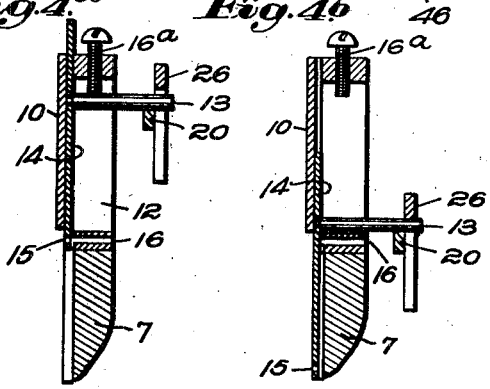
Inventors:
Robert H. Lawson,
Arthur N. Cloutier,
by Emery, Booth, Janney & Varney
Attys.

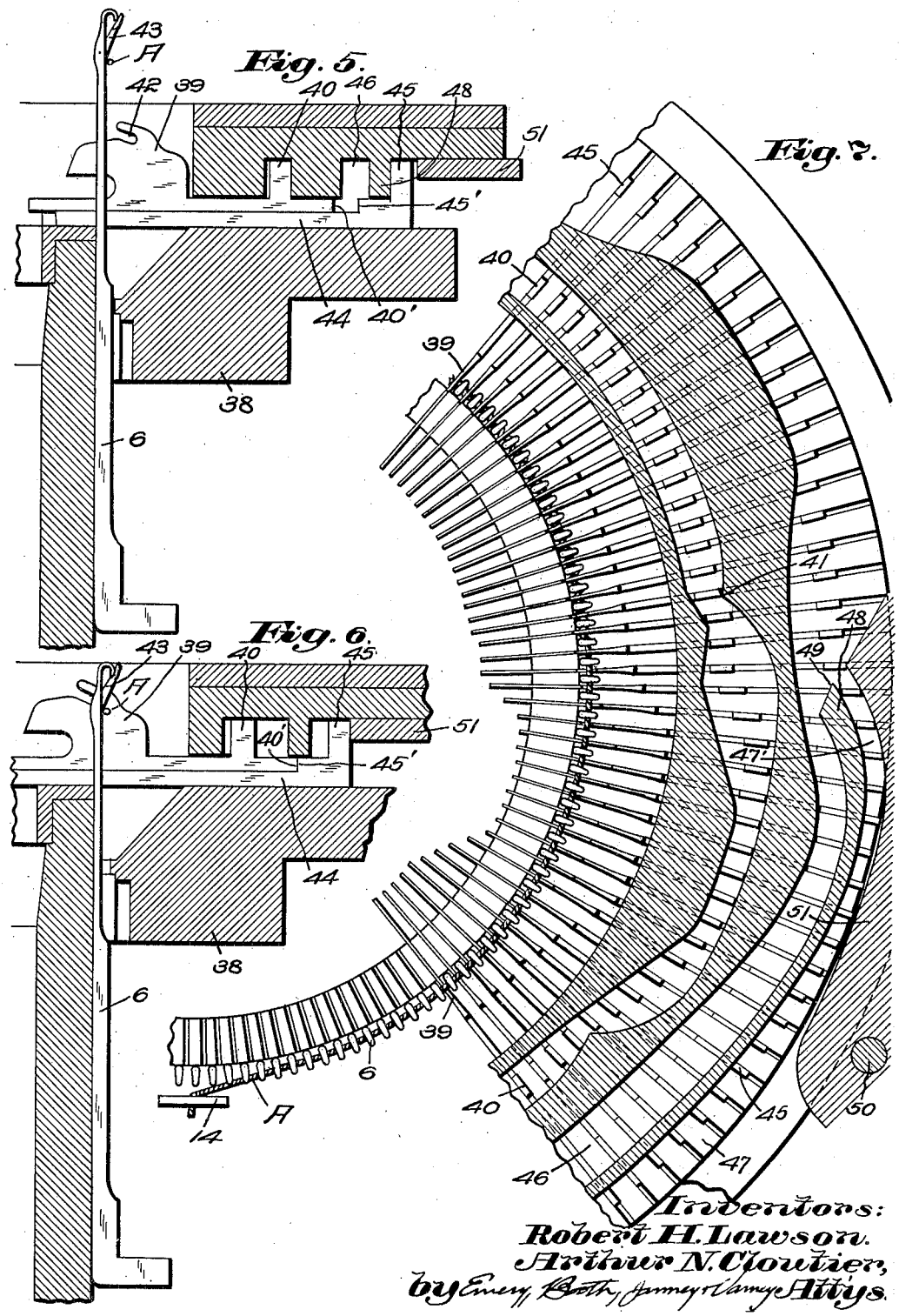

Dec. 13, 1932.   R. H. LAWSON ET AL   1,890,880
METHOD OF AND ATTACHMENT FOR RUNNING-ON KNITTING FABRICS
Filed Aug. 29, 1928     9 Sheets-Sheet 6

Inventors:
Robert H. Lawson.
Arthur N. Cloutier.
by Emery, Booth, Janney & Varney
Attys

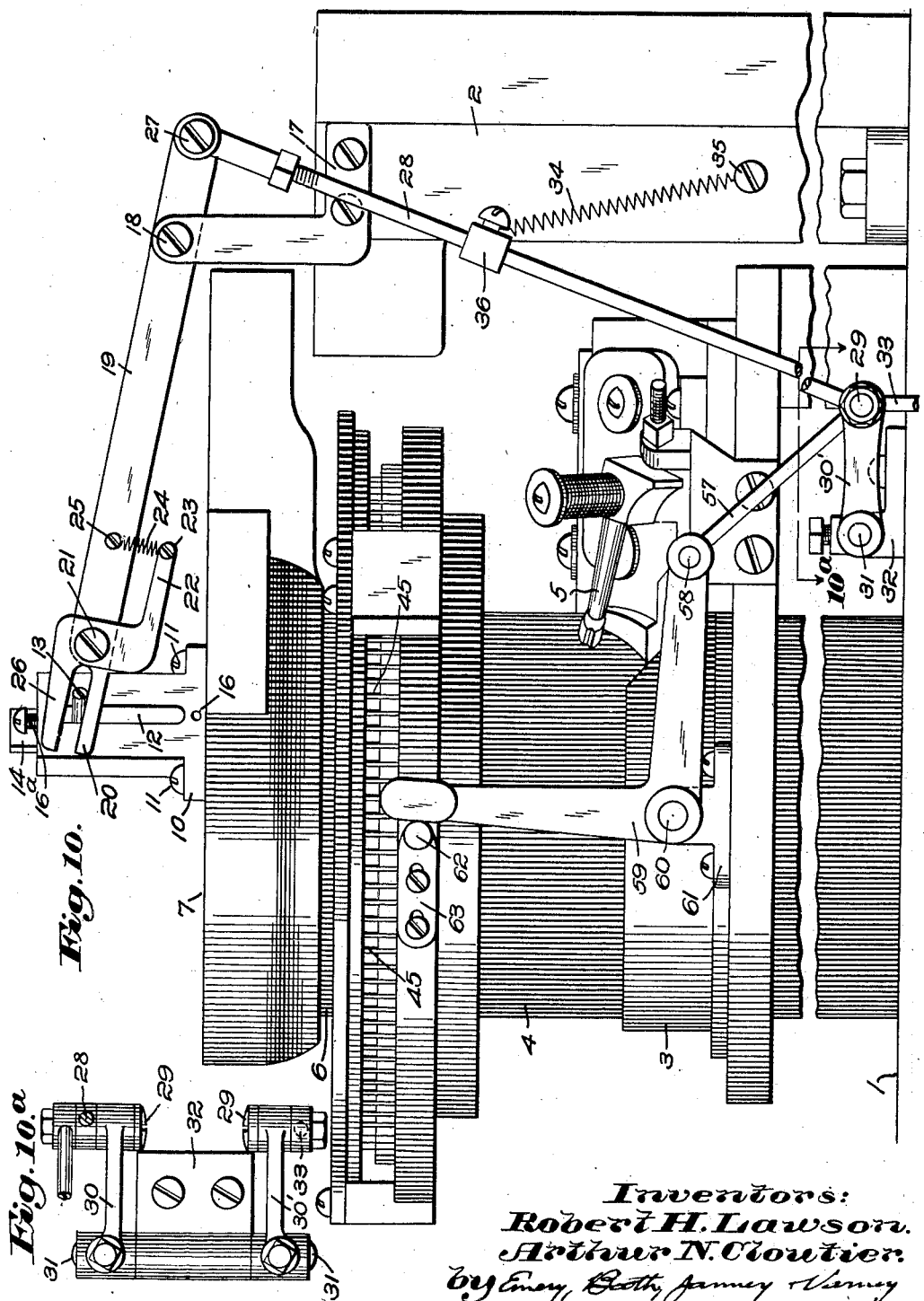

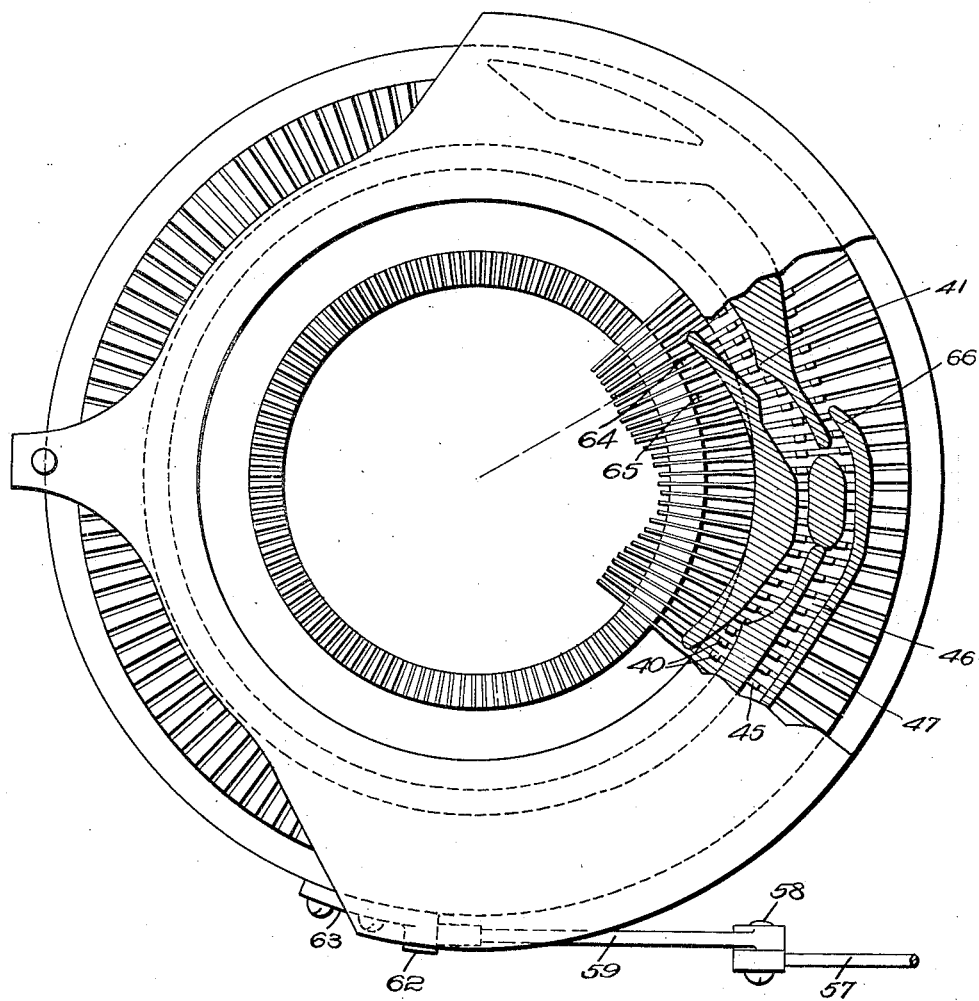

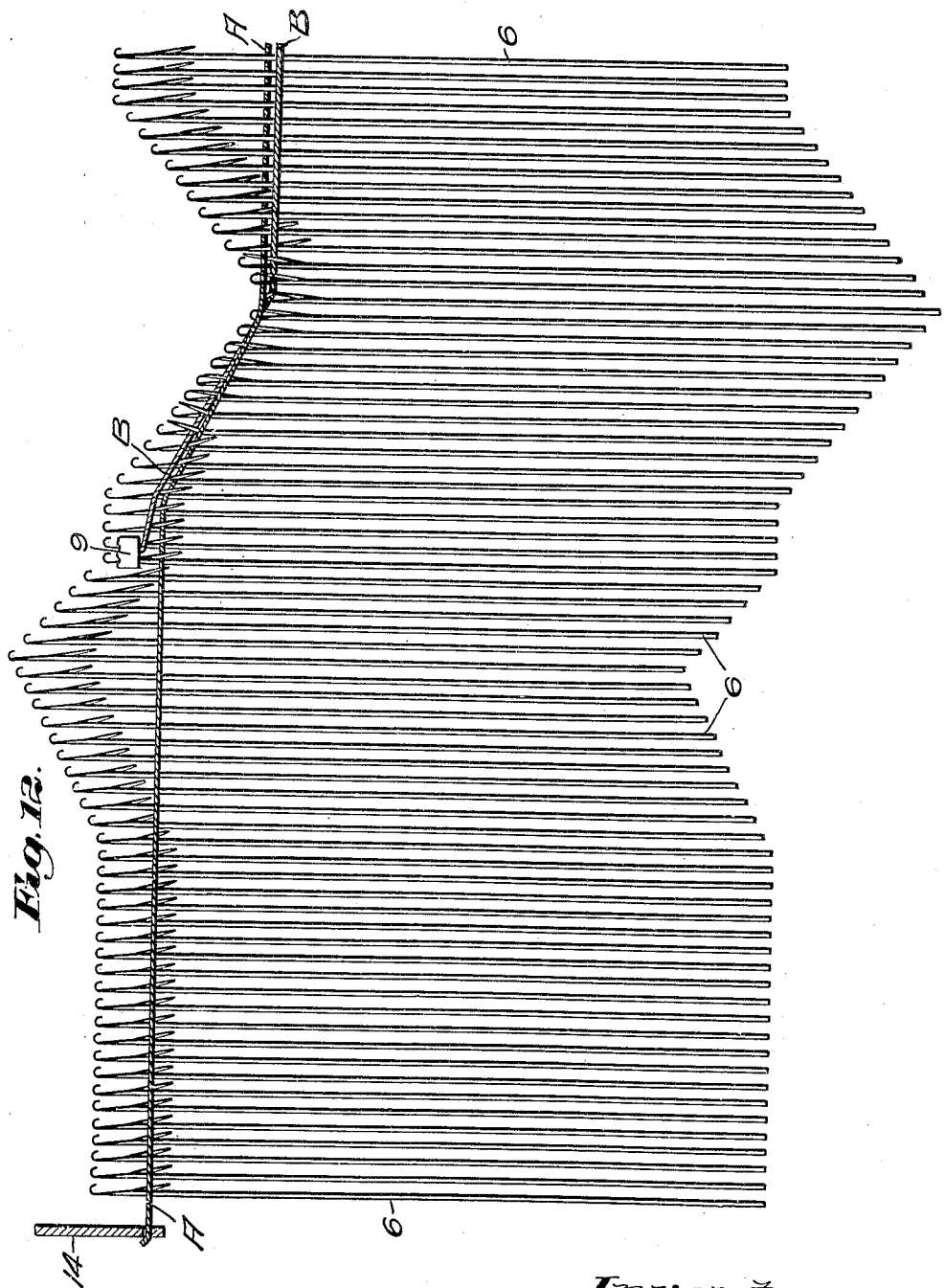

Patented Dec. 13, 1932

1,890,880

UNITED STATES PATENT OFFICE

ROBERT H. LAWSON, OF PAWTUCKET, AND ARTHUR N. CLOUTIER, OF LONSDALE, RHODE ISLAND, ASSIGNORS TO HEMPHILL COMPANY, OF CENTRAL FALLS, RHODE ISLAND, A CORPORATION OF MASSACHUSETTS

METHOD OF AND ATTACHMENT FOR RUNNING-ON KNITTING FABRICS

Application filed August 29, 1928. Serial No. 302,666.

This invention relates to method of and attachments for running-on knitting fabrics, and especially hosiery.

In order that the principle of the invention may readily be understood, we have disclosed in the accompanying drawings one embodiment of means constituting such attachment and the best mode known to us for practicing the method of our invention and producing the resulting fabric structure.

In said drawings,—

Fig. 1 is a front elevation of the upper part of a circular knitting machine having our invention applied thereto;

Fig. 1a is a detail in plan of part of the structure shown in Fig. 1, being partly in section on the line 1a;

Fig. 2 is a plan view thereof;

Fig. 3 is a vertical transverse section taken through the needle cylinder and the parts surrounding and above the same;

Fig. 3a is a detail, being an inside view of means in non-feeding position upon the latch ring for introducing a non-knitting yarn, the function whereof is to close the latches on the yarn that is being taken by the bare needles in beginning the fabric;

Fig. 3b is a view of the same parts in yarn feeding position;

Fig. 4 is a plan view of the sinkers and sinker bed with the sinker cams in horizontal section and also showing immediately associated parts;

Fig. 4a is a detail in vertical section upon the line 4a—4a of Fig. 2 showing in non-feeding position the means for feeding or supplying the non-knitting yarn;

Fig. 4b is a view similar to Fig. 4a but with the parts in yarn feeding or supplying position;

Fig. 5 is a view in vertical transverse section of a portion of the upper end of the needle cylinder, the sinker bed and sinker cam ring, and showing a sinker and jack supported thereby, for the purpose of positioning the non-knitting yarn;

Fig. 6 is a view similar to Fig. 5 but showing the needle depressed and the sinker moved radially inward;

Fig. 7 is a view partly in plan and partly in horizontal section, upon an enlarged scale, of the upper end of the needles, the means for supplying the non-knitting yarn thereto, the sinker cams, sinkers and jacks;

Fig. 10 is a side elevation similar to Fig. 1 but of a slightly modified form of our invention;

Fig. 10a is a view similar to Fig. 1a, but of the said modified form of the invention;

Fig. 11 is a plan, partly in horizontal section of the sinker cap and ring; and

Fig. 12 is an outside front elevation, diagrammatically presented, of a part of the needle circle to show the introduction of the knitting yarn and of the non-knitting yarn.

Figure 8:
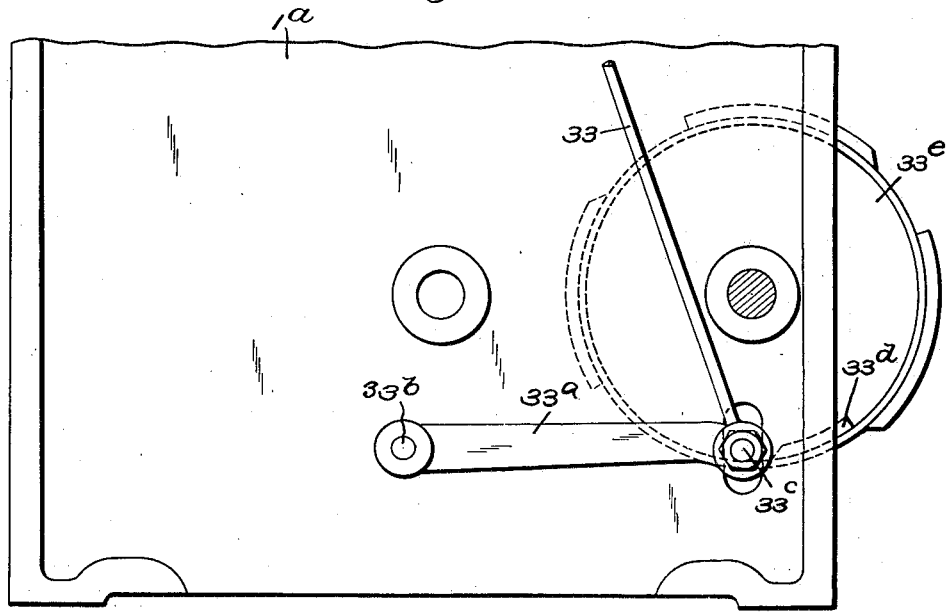
Fig. 8 shows in side elevation cam means for moving into and out of action the non-knitting yarn feeding means.

The purpose of the invention is to start the knitting upon bare needles. While the invention is shown as practiced upon a circular knitting machine having independent latch needles, it is evident that the invention may be practiced upon many different types of knitting machines, whether circular or otherwise constructed, and with many different structures of needles. Preferably the invention is practiced with independent latch needles. We have chosen to illustrate the invention as applied to a circular hosiery machine of the well-known Banner type as disclosed in the patent to Hemphill No. 933,443.

According to the principle of this invention, the needles, and if desired all of them, are operated by rotating or oscillating the machine, and, during the rotation or relative rotation or oscillation of the needle cylinder, laying against the elevated needles below the latches thereof a non-knitting yarn or thread which is desirably laid a plurality of times about the entire series of needles, as, for example, four or five times, more or less. Such yarn or thread which desirably is a relatively coarse one, such, for example, as cotton, is in the laying-in process somewhat corrugated or crinkled in and out between the needles and lies upon the inner surface of the fabric as a separate yarn or thread not knitted into the fabric and hence not existing as a permanent portion of the fabric.

In the disclosed embodiment of means for practicing the invention, as the needles travel at the same level before they are elevated, the said non-knitting yarn or thread is introduced so as to lie against the stems or shanks of the needles below the latches and as the needles continue their travel, they are elevated as usual and then begin their descent toward the knitting point and the knitting yarn or yarns is or are introduced to the bare needles to commence the fabric. It will be apparent that the needles, their latches being open, receive the knitting yarn or yarns and as they descend, the non-knitting yarn acts to close the latches inasmuch as the needles tend in their downward movement toward the knitting point to move downward relatively to said non-knitting yarn, which therefore in its relative upward sliding movement rubs or pushes against the latches, which are still open or partly open, and closes the same. This insures the commencement of the knitting on the bare needles.

Obviously the invention may be applied to a plain hosiery machine, or to any type of machine whether for knitting hosiery or body fabric or otherwise, but we have chosen to illustrate the same as applied to a machine wherein sinkers are employed which are selectively moved radially inward at desired times, according to some stitch variation or pattern that is desired, whether as a part of a plating operation involving the use of a plurality of knitting threads or whether but a single thread is to be supplied. In other words, the invention is of broad application and it is our intention to claim the same broadly. Therefore the ensuing description of the selected embodiment of the invention in no sense constitutes a limitation to the particular structure or mechanism herein disclosed.

Referring more particularly to the drawings, the bed plate of the machine is indicated at 1, the post usually employed in the Banner machine is indicated at 2, the cam carrier at 3, the needle cylinder at 4 and one of the narrowing pickers at 5. If the machine be for hosiery, preferably narrowing and widening pickers are employed in a manner not necessary to explain. The needles are desirably latch needles and are indicated at 6 in the various views. The latch ring is indicated at 7, it being desirably of the usual pivoted character, and it is provided with a mouth piece 8 into which the yarn guide or yarn guides 9 are moved in a manner well understood in the art, so that the proper yarn or thread or plurality thereof as for plating, may be fed at desired times and yarn changes may be made in a manner not necessary to refer to in detail.

Assuming merely for purposes of description that the stocking or like fabric is to be commenced with a single thread or yarn, it will be understood that the proper yarn guide is brought into yarn feeding position in the mouth piece of the latch ring, the needle cylinder being rotated in the usual manner. We provide means to introduce or supply to the needles a non-knitting yarn or thread for the purpose of closing the latches of the needles, so that the needles in a bare condition will take the knitting yarn or yarns and begin knitting when in a bare condition, by reason of the fact that the closing of their latches is insured by the non-knitting yarn.

While to introduce the said non-knitting yarn we may employ many different constructions, we preferably support upon the latch ring means to supply said non-knitting yarn or thread, herein represented at A in the several figures. Herein for the purpose we have represented a bracket 10 secured by screws 11 upon the upper edge of the latch ring. Said bracket is provided with a vertical slot 12, as shown most clearly in Figs. 1, 4a, 4b, and therein is received a horizontal pin 13 which, as shown in Figs. 4a and 4b, is connected to a vertical slide 14 adapted to move in a suitable groove or slide in the bracket 10. Said slide 14 has therein a yarn or thread opening 15 at its lower end and the yarn is supplied to said opening 15 through a passage 16 in the bracket 10, so that the said non-knitting yarn or thread A after passing through said passage 16 extends downwardly along the face of the slide 14 between it and the latch ring 7, and then passes through the opening 15 directly to the needles as shown in Fig. 7. As the needles rotate in the cylinder, the yarn or thread A, which is supplied from a bobbin or other supply upon a creel frame or elsewhere, becomes wrapped tightly against the needles, preferably a plurality of times, for the purpose already described. In the several figures of the drawings, we have illustrated means for moving the slide 14 downward so as to supply the non-knitting yarn A at the commencement of the stocking or other fabric, it being evident that after the non-knitting yarn A has served its purpose of enabling the knitting to commence upon the bare needles, the slide 14 may be withdrawn or elevated into non-functioning position. A limiting screw 16a is provided for the pin 13.

Figure 9:
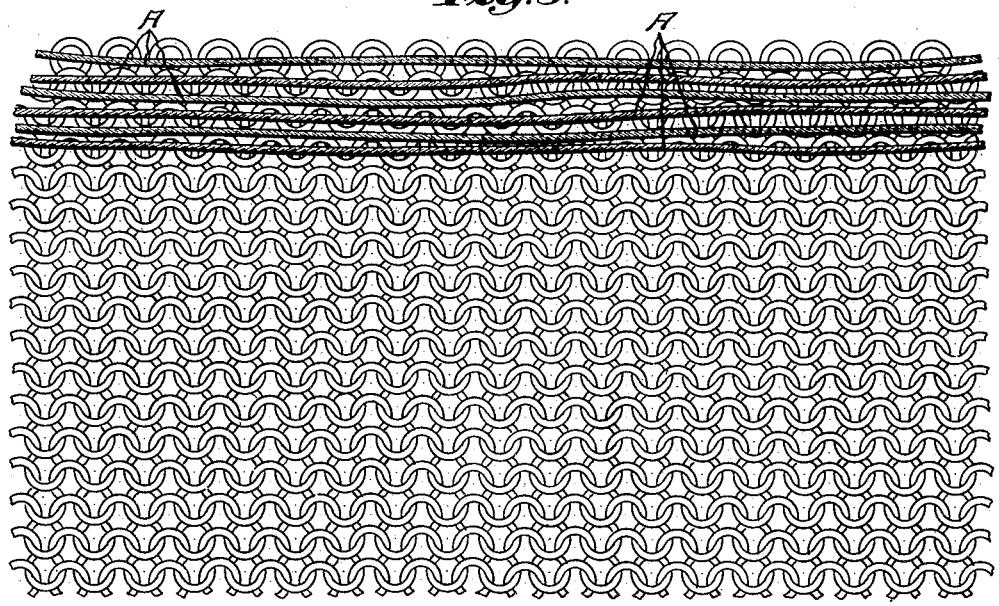
Fig. 9 shows upon an enlarged scale the upper part of the inside of a stocking, illustrating in position the non-feeding yarn by which the latches of the needles are closed.

In Fig. 12, we have represented somewhat diagrammatically a part of the needle circle indicating the knitting wave of the needles 6. The needles are viewed from the outside of the needle circle. The non-knitting yarn A is in practice introduced about one sixth of the circle of needles in advance of the knitting yarn indicated at B in Fig. 12. Said non-knitting yarn A is therefore laid against the latches of those needles which are then at the height indicated at the left hand side of Fig. 3. The needles then rise somewhat (shown in Figs. 3 and 12) as they approach the throat of the latch ring, in conformity with the usual needle wave, the yarn A sliding off the latches, and then the needles begin their descent at the throat of the latch ring. As the needles are descending at the throat, the knitting yarn B is introduced into the hooks of the needles, and as those needles continue their descent, the non-knitting yarn A rubs up along the outer face of the latches, closing said latches against the knitting yarn B. The said needles go down to knit and the non-knitting yarn passes over into the inner face of the fabric and lies there in an entirely unknitted condition. This operation might, if desired, be terminated at the end of one revolution of the knitting head but, as elsewhere stated in the description, it is desirable to continue the feeding of the non-knitting yarn A for a plurality of courses (as, for example, substantially four or five), and we have accordingly in Fig. 9 indicated six turns of the non-knitting yarn as lying against and sticking temporarily to the inner face of the fabric.

It is to be understood that the feeding of the non-knitting yarn A and the feeding of the knitting yarn B begin in one and the same course, and the feeding of the two yarns continues coincidently one or more courses.

The knitting yarn B is received within the hooks of the needles in the usual way, and is shown in Fig. 12 as entering the hooks of the needles during their descent at the throat of the latch ring. The non-knitting yarn A obviously never gets into the latches of the needles. The purpose of that yarn is to act as a device for closing the latches of the needles by the act of rubbing against the outer surface of those latches.

Upon the post 2 there is secured a bracket 17 shown most clearly in Fig. 1, to which is pivoted at 18 a lever 19, whose reduced end 20 underlies the pin 13. Pivoted to the lever 19 near its forward end at 21 is an irregularly shaped lever 22, whose end 23 is yieldingly connected by coiled spring 24 to the lever 19 at 25. The purpose of this construction is, when the lever 19 is depressed at its inner or free end as hereinafter described, to permit yielding of the overlying end 26 of the lever 22 to prevent breakage of the pin 13 or the slide 14.

The lever 19 is adapted to be automatically operated from some suitable cam or other moving part of the mechanism. For this purpose we have pivotally connected to the end of the lever 19 at 27 a rod 28, the lower end whereof is pivotally connected at 29 to a short lever 30 itself pivoted at 31 (see Fig. 1a) upon a bracket 32 on the bed plate 1 of the machine.

On the opposite side of the bracket 32 and pivoted at 31 is a lever 30' which is connected by a rod 33 to a lever 33a pivoted at 33b on side frame 1a and operated by pin 33c and cam 33d on inside of pattern drum 33e.

It will be understood that the function of the cam 33d or other controlling means is to depress the lever 19 at its inner or free end so as to move the yarn supply slide 14 downward into the position shown in Fig. 4b. We have provided a coiled spring 34, the function whereof is to pull downward and toward the right viewing Fig. 1 the link 28. Said spring 34 is connected to the post 2 at 35 and to a collar 36 on said link 28.

We provide means for causing the sinkers or web holders to move relatively to the needles (inward in this disclosure or embodiment of the application) so that they will engage the yarn or thread A which is positioned below the latches of the needles as described. Said yarn or thread is more clearly indicated at A in Figs. 5 and 6, and it will be understood that the sinkers or web holders engage said yarn or thread preferably by reason of the upper notch or throat in said web holders and so somewhat crinkle or corrugate or indent said yarn or thread A between the needles for the purpose and with the result described.

In this embodiment of the invention the sinker bed or support is indicated at 38 and in suitable grooves therein are provided the sinkers or web holders 39 having suitable butts 40 to engage the cam paths. We provide means whereby said sinkers or web holders are moved radially inward in advance of or prior to the knitting point designated at 41, in such manner that as the sinkers are so moved in they engage by their notches 42 the non-knitting yarn or thread A as the needles 6 descend with the already positioned yarn or thread A laid thereagainst as already described. This action causes said yarn or thread A so tightly to engage the said needles 6 that the friction is sufficient to cause said yarn or thread A to close the latches 43, thus ensuring the knitting by the needles of the knitting yarn or yarns introduced by the desired yarn finger or yarn fingers.

In this embodiment of the invention we position in each radial groove of the sinker bed beneath the sinker or web holder 39 a jack 44 having a butt 45. The butts 45 are adapted to travel either in the inner pathway 46 shown in Fig. 7, or the outer pathway 47. When the jacks are in said outer pathway 47, the sinkers are accordingly moved inward in advance of the knitting point 41 so that said sinkers or web holders tightly engage the non-knitting yarn A for the purpose and with the result stated.

When, however, the butts 45 of the jacks 44 are in the outer pathway 47, they would not cause the sinkers 39 to be pushed in at the early period mentioned, unless special means were provided therefor, which we now describe as follows:—We provide means (not shown) whereby, whenever desired, the said butts 45 may be shunted or moved from the outer pathway 47 into the inner pathway 46. It will be observed, viewing Fig. 7, that between the pathways 46 and 47 is a wall 48 terminating at 49. Outside of said wall 48 there is pivoted at 50 a so-called flopper cam 51 most clearly shown in Fig. 4, and normally moved outward so as to be in a non-functioning position by means of a flat spring 52 which presses against the arm 53 of said flopper cam 51. When the flopper cam 51 is moved inward into functioning position, it will be apparent that the butts 45 of the jacks 44 are moved into a pathway 47' formed by the flopper cam 51 and wall 48 thus causing the shoulder 45' of the jack 44 to engage the tail 40' of the sinker 40 (see Fig. 6). This causes the sinkers to be moved inward in advance of the knitting point 41. Any suitable means may be provided so to move the cam 51. For this purpose, we have pivoted at 54 upon the lever 19, as clearly shown in Fig. 1, a right angled lever having a depending arm 55 and a substantially horizontal arm 56 adapted, when the inner end of the lever 19 is moved downward, to engage the pivot 18 of the lever 19 so as to swing toward the right viewing Fig. 1, said depending arm 55 of said lever. As shown in Fig. 4, the said depending arm 55 lies inside the arm 53 of the lever 51 so that the described swinging movement of said depending arm 55 swings the cam 51 inward as already described. It is not necessary in this form of the invention to use the inner pathway 46, which in Fig. 4 is shown as having an inclined cam at the entrance end thereof, which cam (by means not illustrated) is or may be moved to close said pathway.

In the modified form of our invention shown in Figs. 10, 10a and 11, the lever 30 is connected at 29 to a rod 57 pivoted at 58 to one arm of a bell crank lever 59 pivoted at 60 on bracket 61. The upper arm of said bell crank lever engages a pin 62 on the adjustable bracket 63. When the rod 33 is moved upward, the rod 57 rocks the bell crank lever 59 so that the latter acts through the pin 62 to advance slightly circumferentially the sinker head shown in Fig. 11, in the direction of the arrow on the latter figure, thus causing the sinker to be pushed in at an earlier point or time, whereby the non-knitting yarn or thread A tightly engages the needles for the purpose stated.

In Fig. 11 the lowest needle is indicated at 64, and at 65 is indicated the advanced point where the sinkers have been pushed in by the cam 66. We employ a binder 67 to hold the yarn A when it is not being fed or supplied between the needles (see Fig. 2).

It will be evident from the foregoing that the knitting yarn or yarns is or are imprisoned with the hook of the needles (of whatever character employed) by the action of the non-knitting yarn A. It is to be understood that in the specification and claims, wherever a non-knitted or non-knitting yarn or thread is referred to, a yarn other than a knitting yarn is meant.

In referring to the yarn A as a non-knitting yarn, both in the specification and in the claims, we mean a yarn which at no time is knitted in or incorporated into or becomes a permanent part of the fabric. The purpose of the non-knitting yarn is merely to close or assist in closing the latches of the needles, or, more broadly stated, to participate in imprisoning the knitting yarn in the hooks of the needles.

Having thus described one embodiment of the mechanism of our invention and the best mode known to us for practicing the same, we desire it to be understood that although specific terms are employed, they are used in a generic and descriptive sense and not for purposes of limitation, the scope of the invention being set forth in the following claims.

We claim:

1. That method of commencing knitting upon bare needles which includes supplying a non-knitting yarn or thread to the series of needles in such position as to participate in the imprisoning of the knitting yarn or yarns in the hooks of the needles.

2. That method of commencing knitting upon bare latch needles which includes supplying a non-knitting yarn or thread to the series of needles in such position as to participate in closing the latches of the needles to enclose a knitting yarn structurally distinct from said non-knitting yarn.

3. That method of commencing knitting upon bare needles which includes supplying a non-knitting yarn or thread to the series of latch needles in such position to the stems thereof below the latches as to cause the latches to close and imprison the knitting yarn, in the stitch drawing movement of the needles.

4. In a knitting machine, means to introduce a non-knitting yarn to the needles when commencing knitting upon bare needles, in such relation to the needles as to cause the imprisonment of the knitting yarn within the hooks thereof.

5. In a knitting machine, a series of needles, means to feed a knitting yarn, and means to supply a non-knitting yarn in such position to the needles as to effect the imprisonment of the knitting yarn in the hooks thereof.

6. In a knitting machine, a series of latch needles, means to feed a knitting yarn, and means to supply a non-knitting yarn to the stems of the needles below the latches thereof whereby when the needles move to draw their stitches of the knitting yarn, the non-knitting yarn closes or cooperates in closing the latches to enclose said knitting yarn.

7. In a knitting machine, a series of latch needles, means to feed a knitting yarn, and means to supply a non-knitting yarn to the stems of the needles below the latches thereof whereby when the needles move to draw their stitches of the knitting yarn, the non-knitting yarn closes or cooperates in closing the latches to enclose said knitting yarn, said means including sinkers or web holders to engage said non-knitting yarn.

8. In a knitting machine, a series of latch needles, means to feed a knitting yarn, means to supply a non-knitting yarn to the stems of the needles below the latches thereof whereby when the needles move to draw their stitches of a knitting yarn, the non-knitting yarn closes or cooperates in closing the latches to enclose said knitting yarn, and means whereby said non-knitting yarn is introduced only at the commencement of the knitting, thereby to facilitate or cooperating in effecting beginning knitting upon bare needles.

9. In a knitting machine, a series of latch needles, means to feed a knitting yarn, means to supply a non-knitting yarn to the stems of the needles below the latches thereof whereby when the needles move to draw their stitches of the knitting yarn, the non-knitting yarn closes or cooperates in closing the latches to enclose said knitting yarn, and means acting automatically to render active and inactive the feeding of said non-knitting yarn.

10. That method of commencing knitting upon bare, pivoted, latch needles which includes supplying a non-knitting yarn or thread to the series of said needles in such position as to participate in the imprisoning of the knitting yarn or yarns in the hooks of the said needles, said non-knitting yarn or thread not becoming a permanent part of the fabric.

11. That method of commencing knitting upon bare, pivoted, latch needles which includes supplying a non-knitting yarn or thread to the series of said needles in such position as to participate in closing the said latches of the needles to enclose the knitting yarn when the needles move to draw their stitches of the knitting yarn, said non-knitting yarn or thread not thereby becoming a permanent part of the fabric.

12. That method of commencing knitting upon bare, pivoted, latch needles which includes supplying a non-knitting yarn or thread to the series of said needles in such position to the stems thereof below the said latches as to cause the said latches to close and imprison the knitting yarn, in the stitch drawing movement of the said needles, without making said non-knitting yarn or thread a permanent part of the fabric.

13. In a knitting machine, means to introduce a non-knitting yarn to the pivoted latch needles thereof when commencing knitting upon bare, pivoted, latch needles, in such relation to the said needles as to cause the imprisonment of the knitting yarn within the hooks thereof, without making said non-knitting yarn a permanent part of the fabric.

14. In a knitting machine, a series of pivoted latch needles, means to feed a knitting yarn, and means to supply a non-knitting yarn in such position to the said needles as to effect the imprisonment of the knitting yarn in the hooks thereof, without making said non-knitting yarn a permanent part of the fabric.

15. In a knitting machine, a series of pivoted latch needles, means to feed a knitting yarn, and means to supply a non-knitting yarn to the stems of the said needles below the pivoted latches thereof, whereby, when the needles move to draw their stitches of the knitting yarn, the non-knitting yarn functions in closing the pivoted latches to enclose said knitting yarn, without said non-knitting yarn becoming incorporated permanently into the fabric.

16. In a knitting machine, a series of pivoted latch needles, means to feed a knitting yarn, and means to supply a non-knitting yarn to the stems of the said needles below the pivoted latches thereof, whereby, when the said pivoted latch needles move to draw their stitches of the knitting yarn, the non-knitting yarn closes or cooperates in closing the said pivoted latches to enclose said knitting yarn, without incorporating the non-knitting yarn into the fabric, said means including sinkers or web holders to engage said non-knitting yarn.

17. In a knitting machine, a series of pivoted latch needles, means to feed a knitting yarn, means to supply a non-knitting yarn to the stems of the pivoted latch needles below the pivoted latches thereof, whereby when the pivoted latch needles move to draw their stitches of the knitting yarn, the non-knitting yarn functions in the closing of the latches to enclose said knitting yarn, without, however, becoming incorporated as a permanent part of the fabric, and means whereby said non-knitting yarn is introduced only at the commencement of the knitting, thereby to facilitate the beginning of the knitting upon bare, pivoted latch needles.

18. In a knitting machine, a series of pivoted latch needles, means to feed a knitting yarn, means to supply a non-knitting yarn to the stems of the pivoted latch needles below the pivoted latches thereof, whereby, when the pivoted needles move to draw their stitches of the knitting yarn, the non-knitting yarn functions in the closing of the latches to enclose said knitting yarn, without, however, becoming incorporated permanently into the fabric, and means automatically to render active and inactive the feeding of said non-knitting yarn.

19. That method of commencing knitting upon bare, pivoted latch needles which includes supplying a non-knitting yarn or thread to the series of said needles in such position that said non-knitting yarn functions in the imprisoning of the knitting yarn or thread in the hooks of the said needles without said knitting yarn becoming permanently incorporated into the fabric.

20. In a knitting machine, a series of pivoted latch needles, means to feed a knitting yarn, and means to supply a non-knitting yarn to the stems of the said needles below the pivoted latches thereof, whereby, when the said needles move to draw their stitches of the knitting yarn, the non-knitting yarn functions in the closing of the latches to enclose the said knitting yarn, without said non-knitting yarn becoming permanently incorporated in the fabric.

In testimony whereof, we have signed our names to this specification.

ROBERT H. LAWSON.
ARTHUR N. CLOUTIER.